United States Patent [19]

Alferness

[11] 4,384,760
[45] May 24, 1983

[54] POLARIZATION TRANSFORMER

[75] Inventor: Rodney C. Alferness, Holmdel, N.J.

[73] Assignee: Bell Telephone Laboratories, Incorporated, Murray Hill, N.Y.

[21] Appl. No.: 216,309

[22] Filed: Dec. 15, 1980

[51] Int. Cl.³ .............................................. G02B 5/176
[52] U.S. Cl. ................................. 350/96.14; 350/384; 350/389
[58] Field of Search ................... 350/96.13, 96.14, 370, 350/374, 384, 389, 392; 333/21 R, 21 A

[56] References Cited

U.S. PATENT DOCUMENTS

| | | | |
|---|---|---|---|
| 3,874,782 | 4/1975 | Schmidt | 350/96.14 X |
| 3,877,782 | 4/1975 | Kaminow | 350/96.14 |
| 4,157,860 | 6/1979 | Marcatili | 350/96.14 |
| 4,179,189 | 12/1979 | Kaminow et al. | 350/96.33 |
| 4,262,993 | 4/1981 | Burns et al. | 350/96.14 |
| 4,273,411 | 6/1981 | Alferness | 350/96.14 |
| 4,291,939 | 9/1981 | Giallorenzi et al. | 350/96.14 |
| 4,310,813 | 1/1982 | Yuuki et al. | 333/21 A X |

OTHER PUBLICATIONS

Okamura et al., "Electro-Optic Guided-to-Radiation Mode Conversion . . . ", A. P. L., vol. 32, No. 3, Feb. 1978, pp. 161–163.

Kondo et al., "Wavelength Selective Optical Fiber Switches Based On . . . ", Proc. of Opt. Commun. Conf., Amsterdam, Sep. 1979, pp. 16.7-1 to 5.

Alferness et al., "Electro-Optic Waveguide TE⇌TM Mode Converter . . . ", Optics Lett., vol. 5, No. 11, Nov. 1980, pp. 473–475.

Primary Examiner—John D. Lee
Attorney, Agent, or Firm—S. Sherman

[57] ABSTRACT

A generalized polarization transformer (10) is disclosed that is capable, under electrical control, of transforming the polarization of a signal between two arbitrary states. In its most general form, the transformer comprises a variable input phase shifter (11) for varying the relative phase between an incident pair of orthogonally polarized wave components; a variable mode converter (12) for varying the relative amplitudes of said orthogonally polarized wave components; and a variable output phase shifter (13) for varying the relative phase between the wave components derived from said mode converters. For some applications, the output phase shifter is not required. In an alternative configuration, the input phase shifter and the mode converter are combined in a common construction.

7 Claims, 6 Drawing Figures

POLARIZATION TRANSFORMER

TECHNICAL FIELD

This application relates to polarization transformers and, in particular, to devices for controlling the polarization of optical waves.

BACKGROUND OF THE INVENTION

Optical waveguides capable of transmitting an optical signal with only one direction of polarization are desirable for use with integrated optical devices. However, it is well known that even the so-called "single mode" fibers do not maintain linear polarization over extended distances. As a result, the polarization of a signal received at the outpt end of a fiber is uncertain and, indeed, changes with time. To accommodate such signals, efforts have been made to devise polarization-independent optical devices. (See, for example, U.S. patent application Ser. No. 14,832 by R. C. Alferness, filed Jan. 24, 1980, now U.S. Pat. No. 4,273,411.) However, there is a class of interferometric signal processing techniques for which the polarization of the received signal must be along a specified direction. Heterodyne detection and fiber interferometers are two such examples.

One solution to this problem is to use specially prepared fibers which employ stress-induced birefringence to maintain linear polarization. (See U.S. Pat. No. 4,179,189.) However, these fibers exhibit rather high losses and, to date, only short lengths have been made.

SUMMARY OF THE INVENTION

The present invention is a polarization transformer which is capable of accepting an incident optical signal of any arbitrary polarization and producing an output signal having any other arbitrary polarization. In its most general form, the polarization transformer comprises an input phase shifter for varying the relative phase between orthogonally polarized components of the incident wave, a mode converter for varying the relative magnitudes of said orthogonally polarized wave components, and an output phase shifter for varying the relative phase of the two orthogonally polarized components derived from the mode converter.

In a first illustrative embodiment of the invention, the input phase shifter and the mode converter are arranged in cascade along the signal wavepath. In an alternative embodiment of the invention, the input phase shifter and mode converter are made to operate over a common portion of the signal wavepath, thus reducing the overall length of the transformer.

For many applications of particular interest, wherein an arbitrarily polarized wave is to be converted to a linearly polarized wave (i.e., TM or TE), the output phase shifter can be omitted.

DETAILED DESCRIPTION

Figure 1:
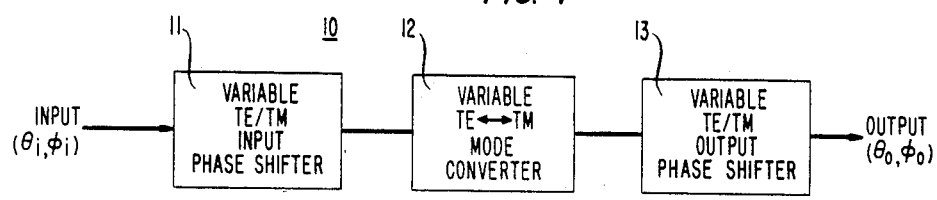
FIG. 1 shows, in block diagram, a polarization transformer in accordance with the present invention.

Referring to the drawings, FIG. 1 shows, in block diagram, a polarization transformer 10 in accordance with the present invention comprising a variable input phase shifter 11 for varying the relative phase between orthogonally polarized components of the incident wave, a variable mode converter 12 for varying the relative magnitudes of the orthogonally polarized wave components, and a variable output phase shifter 13 for varying the relative phase between the orthogonally polarized components derived from converter 13. For reasons which will become apparent hereinbelow, the orthogonally polarized wave components have been designated the TE and TM modes, and will be referred to as such in the description that follows.

In operation, an input wave of arbitrary polarization is applied to the polarization transformer. The latter is designed to convert the input polarization to any other desired arbitrary polarization at the transformer output. In general, the polarization state of a wave can be defined by two parameters $\theta$ and $\phi$, where $\theta$ defines the relative magnitudes of the TE and TM wave components, and $\phi$ defines their relative phase. In terms of these parameters, the incident wave can be given by $$\begin{vmatrix} A_{TE} \\ A_{TM} \end{vmatrix} = \begin{vmatrix} \cos\theta \\ e^{j\phi}\sin\theta \end{vmatrix} \quad (1)$$

For $\phi = 0$, the wave is linearly polarized at an angle $\theta$. A TE polarized wave is represented by $\theta = 0$. A TM wave is obtained when $\theta = \pi/2$. Circular polarization is obtained, for example, when $\theta = \pi/4$ and $\phi = \pm\pi/2$. In terms of these parameters, transformer 10 converts an input wave of arbitrary polarization ($\theta_i$, $\phi_i$) to an output wave of arbitrary polarization ($\theta_o$, $\phi_o$).

Figure 2:
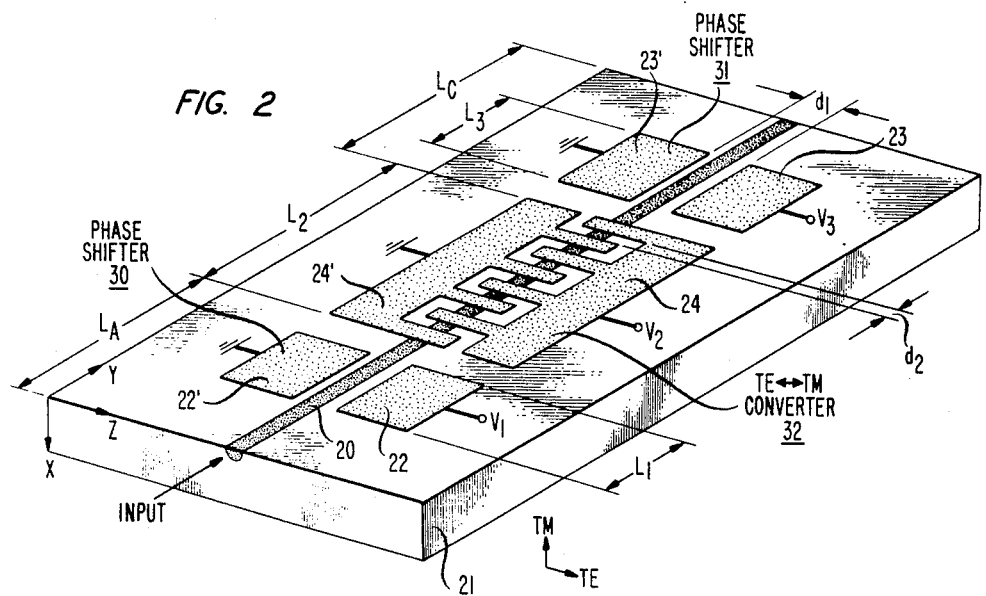
FIG. 2 shows a specific embodiment of a polarization transformer for use with optical guided waves.

FIG. 2, now to be considered, illustrates a specific embodiment of a polarization transformer particularly adapted for use with guided optical waves. In this embodiment, the optical wavepath 20 is a metal diffused waveguide embedded in an x-cut, y-propagating lithium niobate (or tantalate) crystal substrate 21. Advantageously, the waveguide is fabricated so that it supports a single TF and a single TM mode, whose directions of polarization are as indicated.

The input phase shifter 30, of length $L_1$, is defined by a first pair of electrodes 22-22'. The output phase shifter 31, of length $L_3$, is defined by a second pair of electrodes 23-23'. Both electrode pairs provide a z-directed electric field component which electrooptically controls the relative phase $\phi$ between the TE and TM mode components in waveguide 20. This control is a function of the different electrooptic components seen by the two modes. The effect of each phase shifter upon the TE and TM components can be expressed by a 2×2 matrix $$P = \begin{vmatrix} 1 & 0 \\ 0 & e^{j\Delta\phi} \end{vmatrix} \quad (2)$$

where $$\Delta\phi = \Delta\phi_o + \delta\phi; \quad (3)$$

$\Delta\phi_o$ is the fixed TE/TM phase shift due to the total birefringence for no applied field; and
$\delta\phi$ is the electrooptically induced phase shift.

Thus, for input phase shifters 30, $\Delta\phi_i$ is given $$\Delta\phi_i = \frac{2\pi}{\lambda}\left[L_A(N_{TM} - N_{TE}) + \frac{\alpha V_1 L_1}{2d}(n_o^3 r_{13} - n_e^3 r_{33})\right], \quad (4)$$

where
$L_A$ is the total length between the input of the transformer and the input of the mode converter 32;
$\lambda$ is the optical wavelength;
$L_1$ is the length of electrodes 22 and 22';
$V_1$ is the magnitude of the applied voltage;
$\alpha$ is the overlap parameter;
$N_{TM}$, $M_{TE}$ are the effective indices;
$d$ is the interelectrode gap;
$n_o$, $n_e$ are the ordinary and extraordinary indices; and
$r_{13}$, $r_{33}$ are the electrooptic coefficients.

A similar expression can be written for the change in phase, $\Delta\phi_o$, produced by the output phase shifter 31.

The center set of electrodes 24-24' provide the voltage for effecting TE⇌TM mode conversion in the manner described in U.S. Pat. No. 3,877,782. Periodic (i.e., interdigital) electrodes are used to simulate a phase match between the two modes in the highly birefringent substrate material. However, in nonbirefringent electrooptic substrates periodic electrodes are not required. In either case, the electric field is applied so that an off-diagonal element of the reduced electrooptic tensor is utilized. For the x-cut crystal illustrated in FIG. 2, the x-directed field component produced by the interdigital electrodes 24-24' is used to produce mode mixing via the $r_{51}$ coefficient. Alternately, finger electrodes symmetrically disposed on opposite sides of waveguide 20 can be used with a z-cut, y-propagating substrate, as will be illustrated hereinbelow.

In the illustrative embodiment of FIG. 2, with phase matched coupling, the mode converter matrix is $$M = \begin{vmatrix} \cos kL_2 & -j\sin kL_2 \\ -je^{j\phi_B}\sin kL_2 & e^{j\Delta\phi_B}\cos kL_2 \end{vmatrix} \quad (5)$$

where $k = \frac{\alpha\pi}{\lambda}n_o^3 r_{51}\frac{V_2}{d_2}$ $d_2$ is the finger spacing and
$\Delta\phi_B$ is the phase shift in the mode converter due to the total birefringence given by $$\frac{2\pi L_2}{\lambda}(N_{TM} - N_{TE}).$$

To the first order, at least, there is no direct voltage induced phase shift because the x-directed fields alternate in direction along the converter, yielding no net effect, while the y-directed component does not couple to any electrooptic coefficient. Therefore, the phase term $\Delta\phi_B$ is, as noted, simply that due to fixed birefringence.

The total effective matrix, T, for the complete transformer is obtained by multiplying the matrices $P_A$, $P_C$ for the two phase shifters, as given by (2), and the mode converter matrix as given by (5). That is, $$|T| = |P_A||M||P_C| \quad (6)$$

For an arbitrary input polarization ($\theta_i$, $\phi_i$), the output wave $A_o$ is then $$|A_o| = |T||A_i| \quad (7)$$

Carrying out the indicated multiplication, one obtains for the output polarization $$\theta_o = \tfrac{1}{2}\cos^{-1}[\cos 2\theta_i\cos 2kL_2 + \sin 2kL_2\sin 2\theta_i\sin\phi'_i] \text{ and} \quad (8)$$

$$\phi_o = \Delta\phi_B + \Delta\phi_C + \quad (9)$$

$$\tan^{-1}\left[\frac{\cos kL_2\sin\theta_i\sin\phi'_i - \sin kL_2\cos\theta_i}{\cos kL_2\sin\theta_i\cos\phi'_i}\right] -$$

$$\tan^{-1}\left[\frac{-\sin kL_2\sin\theta_i\cos\phi'_i}{\cos kL_2\cos\theta_i + \sin kL_2\sin\theta_i\sin\phi'_i}\right]$$

where $\phi'_i = \phi_i + \Delta\phi_A$.

Figure 3:
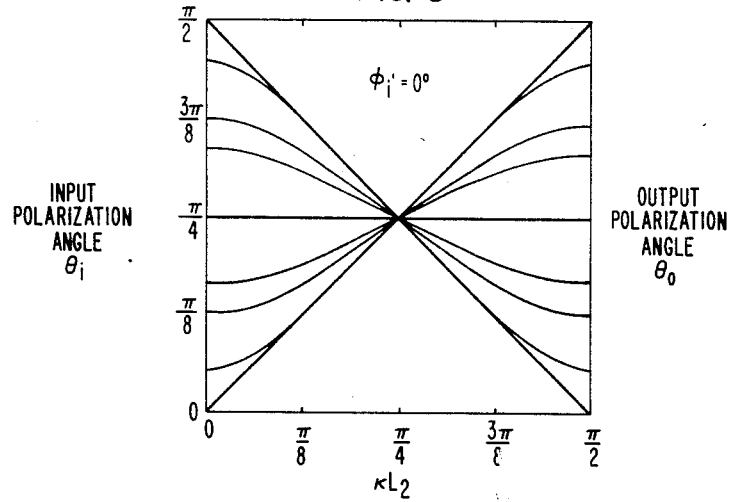
FIG. 3 shows the variation of polarization angle as a function of the mode converter coupling strength.

The importance of the input phase shifter for achieving general polarization transformation is illustrated in FIG. 3. In this Figure, the output polarization $\theta_o$, as given by equation (8), is plotted as a function of the mode converter coupling $kL_2$ for different values of input polarization $\theta_i$ and zero phase angle at the converter input, i.e., $\phi'_i = 0$. When the incident polarization (as read along the left vertical axis) is either pure TE ($\theta_i = 0$) or pure TM ($\theta_i = \pi/2$), all possible output values of $\theta_o$ (as read along the right vertical axis) are achievable with the appropriate converter voltage ($kL_2$). (In fact, this is so for all values of $\phi'_i$, not only for $\phi'_i = 0$.) However, for all other values of $\theta_i$, the range of achievable values of $\theta_o$ is limited. Indeed, for $\theta_i = \pi/4$, the output polarization remains unchanged regardless of the mode converter coupling strength. With the exception noted below, this limitation on the range of output polarizations is true for other values of $\phi'_i$ as well.

The key to achieving arbitrary polarization, in accordance with the present invention, resides in using the input phase shifter to adjust the relative phase between the TE and TM components such that $\phi'_i = \pm\pi/2$. For this condition, equation (8) reduces to $$\theta_o = \theta_i + kL_2 \quad (10)$$

for $\phi'_i = -\pi/2$ and $$\theta_o = \theta_i - kL_2 \quad (11)$$

for $\phi'_i = \pi/2$.

For these special cases, completely arbitrary $\theta_i$ to $\theta_o$ transformations are possible with the mode converter serving as a linear polarization rotator. Thus, in a preferred mode of operation, the input phase shifter is adjusted so that the phase angle $\phi'_i$ at the input to the mode converter is $\pm\pi/2$.

The output relative phase angle $\phi_o$ is determined by the output phase shifter 13. For the preferred case where $\phi'_i = \pm\pi/2$, the output phase angle is given by $$\phi_o = \Delta\phi_B + \Delta\phi_C \pm \pi/2 \quad (12)$$

or $$\phi_o = \phi_i + \Delta\phi_A + \Delta\phi_B + \Delta\phi_C. \quad (13)$$

While an output phase shifter has been included in the illustrative embodiments of FIGS. 1 and 2, there are many practical applications in which an output phase is not required. An example would involve transforming the polarization of an optical signal received from an optical fiber. For typical single mode fibers, the received signal is elliptically polarized with $\theta_i$ and $\phi_i$ slowly varying as a function of time. Generally, what is desired is a linear polarization. For purposes of illustration, it is assumed that the desired polarization is the TM mode, in which case $\theta_o$ is $\pi/2$, and $\phi_o$ is of no consequence. Thus, for this practical case, only two control voltages, $V_1$ and $V_2$, are required. Fortunately for feedback polarization control applications, if these two voltages are adjusted in the proper sequence, the values of $V_1$ and $V_2$ converge to their required values independently. This can be illustrated with reference to FIG. 4 which shows the relationship between the output polarization angle $\theta_o$ as a function of the input phase angle (to the mode converter), $\phi_i'$, for different coupling values $kL_2$.

Figure 4:
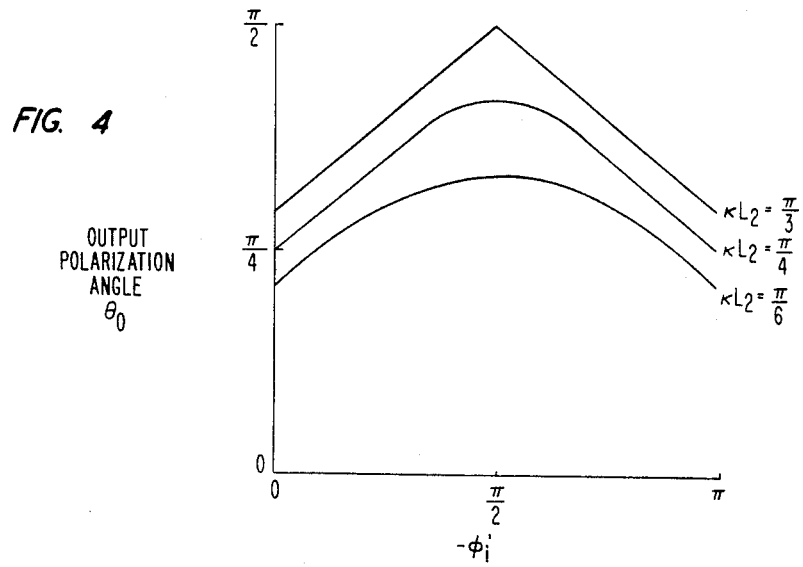
FIG. 4 shows the variation of the output polarization angle as a function of input relative phase for different values of mode converter voltage.

Assuming, for example, input polarization angle, $\theta_i = \pi/6$, we know that we want $\phi_i'$ at the input to the mode converter to be $-\pi/2$, and assume we want the output polarization $\theta_o$ to be $\pi/2$. FIG. 4 shows that for any arbitrary setting of $V_2$, which determines $kL_2$, the measured Tm mode signal will reach a peak when $\phi_i'$ is equal to $-\pi/2$. Thus, $V_1$, which determines $\phi_i'$, is adjusted for maximum output TM component. This value is then fixed, and $V_2$ varied to maximize the output TM component. The resulting values of $V_1$ and $V_2$, determined by this two-step iteration are, in theory, the optimum values. If the order of adjustment is reversed, a two-step iteration will not result in an optimum set of voltages. Therefore, if a feedback control is employed, it is preferable to first adjust the input phase shifter and then the mode converter.

Figure 5:
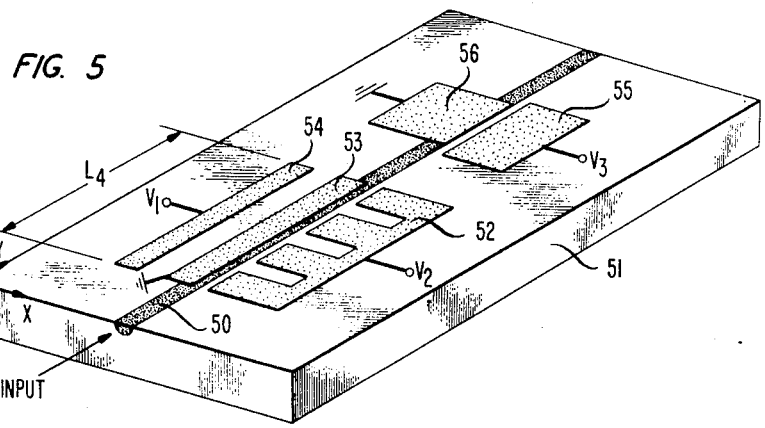
FIG. 5 shows an alternative embodiment of the invention.

FIG. 5 shows an alternate embodiment of the invention in which the input phase shifter and the mode converter operate over a common portion of the optical wavepath. Using a z-cut, y-propagating substrate 51, the phase shift-mode converter portion of the transformer is formed by the three electrodes 52, 53 and 54 which, in the illustrative embodiment, extend over a coextensive interval $L_4$ of waveguide 50. The phase shift is controlled by electrodes 53 and 54, both of which are uniform electrodes. Mode conversion is controlled by electrodes 52 and 53. To simulate a phase match between the TE and TM mode, electrode 52 is a finger electrode. (See, FIG. 2 of U.S. Pat. No. 3,877,782.)

To produce the required field components to effect phase shift and mode conversion simultaneously, electrode 53 is placed such that it overlaps a portion of waveguide 50 over its length $L_4$. So disposed, a voltage $V_1$, applied between electrodes 53 and 54, produces a z-directed component in waveguide 50 which modulates the propagation constants $\beta_{TE}$ and $\beta_{TM}$. A voltage $V_2$, impressed between electrodes 52 and 53 produces an x-directed field component which causes coupling between the two modes. Thus, as in the embodiment of FIG. 2, these two applied fields control the relative phase and magnitudes of a pair of orthogonal modes.

However, unlike the embodiment of FIG. 2, the two voltages do not operate independently upon the two wave components. This becomes apparent if one writes the mode converter matrix for this device and compares it to equation (5). In equation (5), the coefficients are functions solely of $V_2$ through the coupling parameter k. By contrast, in the embodiment of FIG. 5, the coefficients are functions both of k, and $\Delta\beta$, where the latter is a function of $V_1$. Thus, while compressing the functions of the input phase shifter and the mode converter has the advantage of reducing the overall length of the polarization transformer, it has the disadvantage of complicating its control.

As before, an output phase shifter can be included by providing a separate pair of electrodes 55 and 56. To produce the desired z-directed field component through waveguide 50, one of the electrodes 56 overlaps the waveguide. The other electrode 55 can be placed adjacent to the waveguide, as shown in FIG. 5, or it can be located on the lower surface of the substrate, directly below waveguide 50.

To demonstrate the operation of the invention, a transformer was constructed as follows: A 2 $\mu$m wide strip of Ti $\approx$ 290 A thick was photolithographically defined on a x-cut, y-propagating lithium niobate crystal. The metal was indiffused at 980° C. for four hours in flowing argon with cool down in flowing oxygen. Both flow gases were bubbled through water. The resulting waveguide supports a single TE and TM mode. A $SiO_2$ buffer layer 1200 A thick was deposited using chemical vapor deposition to eliminate electrode loading losses. The phase shifter ($L_1 = L_3 = 4$ mm) and mode converter electrodes ($L_2 = 3$ mm and 7 $\mu$m period) were then aligned over the waveguide. The crystal ends were cut and polished to allow end fire coupling.

Figure 6:
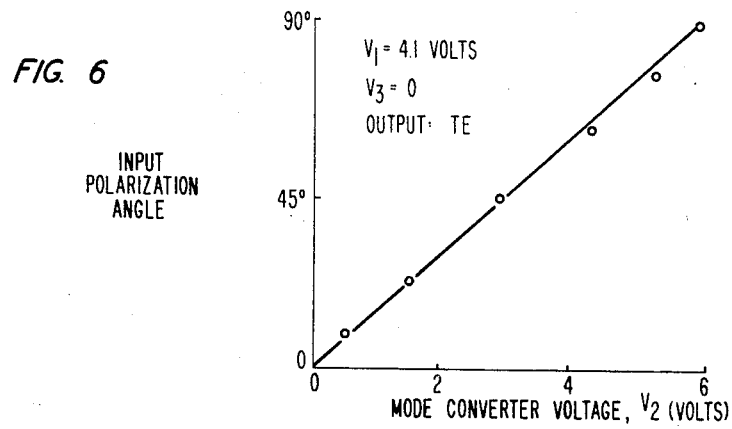
FIG. 6 shows the mode converter voltage required to convert an arbitrary linearly polarized input wave to TE polarization for a particular embodiment of the invention.

The device was tested at $\lambda \approx 0.6$ $\mu$m in several modes of operation. First, the necessity of the first phase shifter was verified; for $V_1 = 0$ arbitrary $\theta_i \rightarrow \theta_o$ transformations could not be achieved regardless of the mode converter voltage. Next, the device was operated as a linear rotator with the goal of transforming an arbitrary input linear polarization to an output wave that is pure TE. To find the proper value of $V_1$ to achieve a $\pi/2$ phase shift at the mode converter, $\theta_i$ was set to $\pi/4$ and $V_1$ adjusted to maximize the output TE component. Once determined, this value of $V_1$ was fixed. The required mode converter voltage to achieve purely TE output polarization versus the input polarization angle was then measured. The results are shown in FIG. 6. As predicted, a linear rotation is observed and, indeed, any value of $\theta_i$ can be transformed. The rotation rate is 15°/volt. The desired transformation was achieved with high fidelity. The orthogonal polarization component (TM) was typically greater than 23 dB down from the desired one. With care in voltage adjustment, values of $-27$ dB could be achieved.

Because the large birefringence of lithium niobate necessitates periodic electrodes for the mode converter, the demonstrated device was effective only over a limited spectral bandwidth (FWHM of 10 A). However, the device can be broadbanded either by shortening the mode converter electrode length or by linearly varying the electrode period. Alternately the device can be fabricated using a less birefringent substrate like lithium tantalate or a nonbirefringent one.

What is claimed is:

1. An optical wave polarization transformer comprising:
   an input phase shifter for changing the relative phase between an incident pair of orthogonally polarized optical wave components; and
   a mode converter for changing the relative amplitudes of said orthogonally polarized optical wave components.

2. The polarization transformer according to claim 1 including an output phase shifter for changing the relative phase between the wave components derived from said mode converter.

3. The polarization transformer according to claim 1 wherein said input phase shifter and said mode converter are arranged in cascade along the wavepath traversed by said wave components.

4. The polarization transformer according to claim 1 wherein said input phase shifter and said mode converter extend along a common portion of the wavepath traversed by said wave components.

5. The polarization transformer according to claim 1 comprising an electrooptic, longitudinally extending optical wavepath;
   a first pair of electrodes disposed along said wavepath for varying the propagation constants of TE and TM polarized wave components propagating therealong;
   and a second pair of electrodes disposed along said wavepath for varying the relative magnitudes of said TE and TM components.

6. The transformer according to claim 5 wherein said first and second pair of electrodes extend along different portions of said optical wavepath.

7. The transformer according to claim 5 wherein said first and second pair of electrodes extend along a common portion of said optical wavepath.

* * * * *

UNITED STATES PATENT AND TRADEMARK OFFICE
CERTIFICATE OF CORRECTION

PATENT NO. : 4,384,760

DATED : May 24, 1983

INVENTOR(S) : Rodney C. Alferness

It is certified that error appears in the above-identified patent and that said Letters Patent is hereby corrected as shown below:

Column 1, line 21, "14,832" should read --114,832--. Column 2, line 51, "TF" should read --TE--. Column 3, line 8, "given" should read --given by--; line 21, "$M_{TE}$" should read --$N_{TE}$--. Column 5, line 32, "Tm" should read --TM--. Column 6, line 25, "A" should read --$\frac{O}{A}$--; line 31, "A" should read --$\frac{O}{A}$--; line 62, "A" should read --$\frac{O}{A}$--.

*Signed and Sealed this*

*Seventeenth* Day of *January 1984*

[SEAL]

*Attest:*

GERALD J. MOSSINGHOFF

*Attesting Officer*     *Commissioner of Patents and Trademarks*